UNITED STATES PATENT OFFICE.

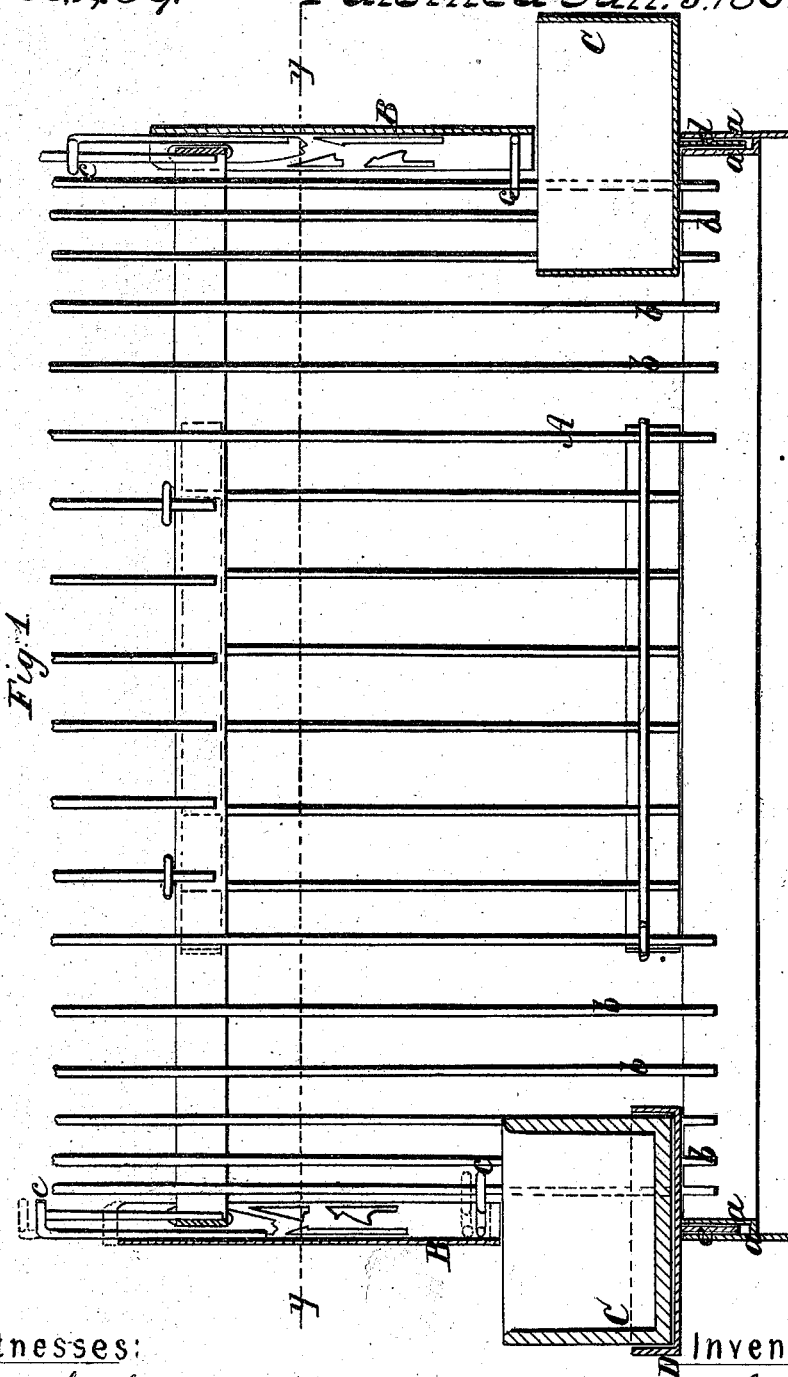

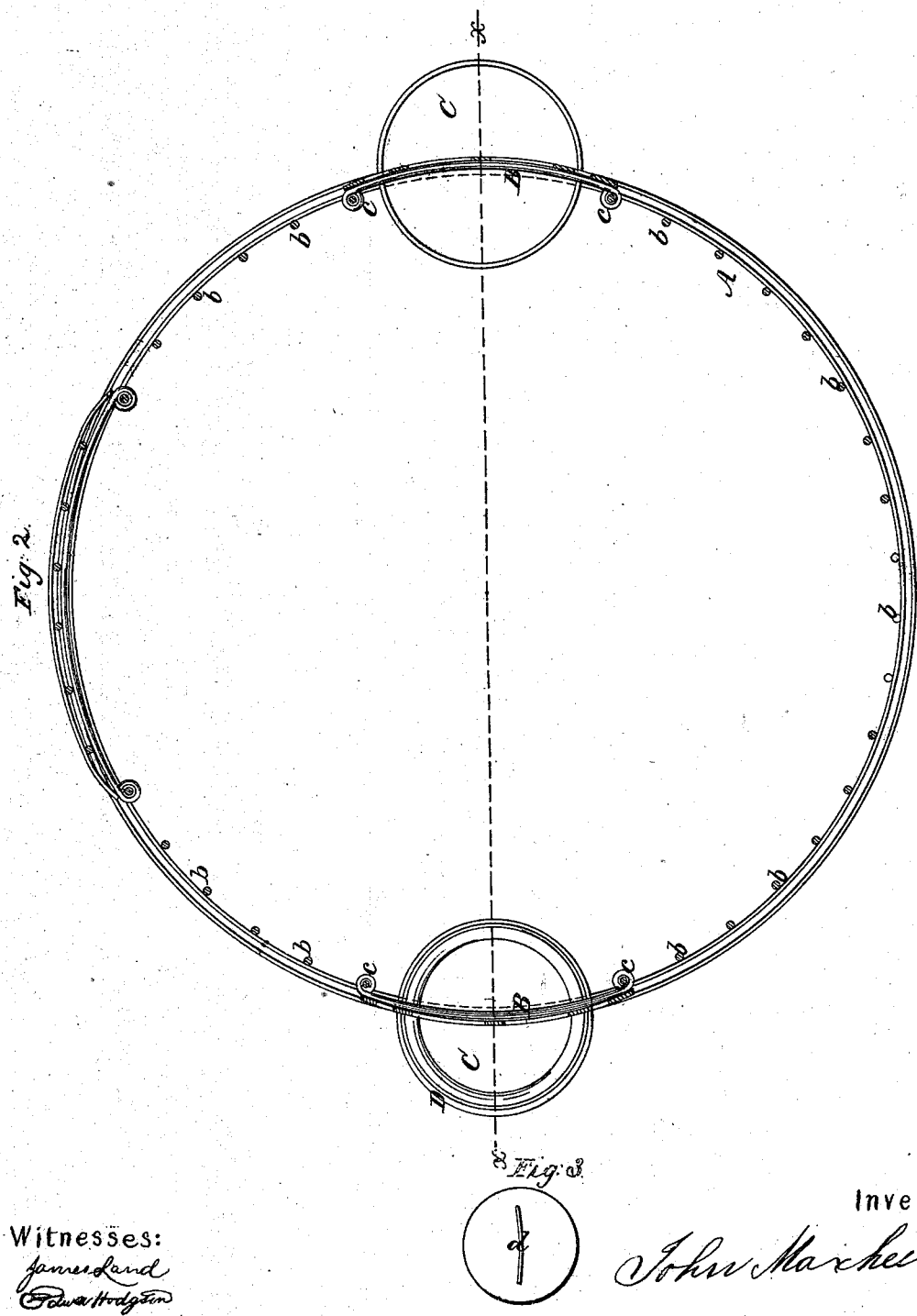

JOHN MAXHEIMER, OF NEW YORK, N. Y.

IMPROVEMENT IN BIRD-CAGES.

Specification forming part of Letters Patent No. 35,459, dated June 3, 1862.

*To all whom it may concern:*

Be it known that I, JOHN MAXHEIMER, of the city, county, and State of New York, have invented a new and useful Improvement in Bird-Cages; and I do hereby declare that the following is a full, clear, and exact description of the same, reference being had to the accompanying drawings, making a part of this specification, in which—

Figure 1 is a vertical central section of a bird-cage with my improvement applied to it. Fig. 2 is a horizontal section of the same taken in the line $x\,x$, Fig. 1. Fig. 3 is a detached inverted plan of a cup pertaining to the invention.

Similar letters of reference indicate corresponding parts in the several figures.

To enable those skilled in the art to fully understand and construct my invention, I will proceed to describe it.

A represents the lower part of a bird-cage, which may be of any proper form and is provided with two bands or rims, $a\,a$, at its lower part, one band or rim being within the other and the wires $b$ attached to the innermost one.

B B are two vertical doors provided with eyes $c$ at their sides and tops, which are fitted on the wires $b$, which coincide with their position and serve as guides to admit of the doors working up and down.

Directly underneath each door B there is a cup, C. These cups may be of the usual cylindrical form and of glass, porcelain, or metal. If the latter material be used, a curved pendent flange, $d$, is attached to the center of their bottoms to fit between the bands or rim $a\,a$ and secure them to the cage directly over the bands or rims, about one half the cups being within the cage and the other half at the outer side, as shown in the figures. If glass or porcelain be used as a material for the cups, the latter may be placed in a metal socket, D, having a curved pendent flange, $e$, attached to its bottom to be inserted between the bands or rims $a\,a$, as shown clearly in Fig. 1.

When the cups are attached to the cage, the lower ends of the doors B B rest upon them at the centers of their tops, and it will be seen that the cups when attached to the cage may be replenished with seed or water at the outer sides of the doors, and hence they do not, as hitherto, require to be removed for that purpose. It will also be seen that the bird has access to the cups at the inner side of the cage. When the cups require to be cleaned, they are removed from the cage and the doors B B drop by their own gravity and close the openings in which the cups were placed, thereby preventing, without any special manipulation on the part of the operator or attendant, the escape of the bird.

I would remark that, if desired, the doors B B at their lower ends may be provided with flanges to project down a trifle into the cups to serve as a partition therein and prevent the seed being thrown out of the cups by the bird. This result, however, will probably be attained by having the doors simply resting on the centers of the cups, as the bill of the bird cannot be projected far underneath the doors.

The invention will not involve any additional cost in the manufacture of the cage and will unquestionably prevent the escape of birds, which are very frequently lost by careless attendants in removing the cups of ordinary cages to replenish them with seed and water and to clean them.

The use of sliding doors is old, and this I do not claim; but,

Having thus described my invention, what I claim as new, and desire to secure by Letters Patent, is—

The arrangement and combination of the cups C with the cage A and sliding doors B, as herein shown and described, so that the door will rest upon the cups, holding them in place and preventing the waste of seed, also permitting the filling of the cups without their removal, likewise entirely closing the opening when the cups are removed for cleaning, all as set forth.

JOHN MAXHEIMER.

Witnesses:
    JAMES LAIRD,
    EDW. W. HODGSON.